United States Patent
Quan et al.

(10) Patent No.: US 7,519,002 B2
(45) Date of Patent: Apr. 14, 2009

(54) METHOD OF SWITCHING BETWEEN MULTIPLE CALL SIGNALING PROTOCOL STACKS IN A VOICE QUALITY TESTER AND APPARATUS USING SAME

(75) Inventors: James P. Quan, Colorado Springs, CO (US); Samuel M. Bauer, Colorado Springs, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 1378 days.

(21) Appl. No.: 10/225,145

(22) Filed: Aug. 22, 2002

(65) Prior Publication Data

US 2004/0037228 A1    Feb. 26, 2004

(51) Int. Cl.
*H04L 12/26* (2006.01)
(52) U.S. Cl. .................. 370/244; 370/248; 370/251; 715/734; 714/25; 714/46; 714/714
(58) Field of Classification Search .......... 370/241.1, 370/243, 247, 244, 251, 242, 248, 254, 252; 714/713, 714, 25–57, 712; 715/734; 381/58; 379/1.01, 1.02, 1.04, 2–31
See application file for complete search history.

(56) References Cited

U.S. PATENT DOCUMENTS

| | | | | |
|---|---|---|---|---|
| 6,148,336 | A * | 11/2000 | Thomas et al. | 709/224 |
| 6,389,111 | B1 * | 5/2002 | Hollier et al. | 379/28 |
| 6,604,139 | B1 * | 8/2003 | Sajina et al. | 709/224 |
| 6,775,240 | B1 * | 8/2004 | Zhang et al. | 370/251 |
| 7,012,893 | B2 * | 3/2006 | Bahadiroglu | 370/231 |
| 2002/0131604 | A1 * | 9/2002 | Amine | 381/58 |
| 2002/0167936 | A1 * | 11/2002 | Goodman | 370/352 |
| 2006/0072709 | A1 * | 4/2006 | Rancu et al. | 379/9.01 |

OTHER PUBLICATIONS

RFC 895, Jon Postel, A standard for transmission of IP datagrams over Experimental Ethernet neworks, Apr. 1984, entire document.*
IEEE 802.3-1985, Carrier Sense Access with collision dectection (CSMA/CD) access metholdand physical layer specifications, Dec. 21, 1084, IEE standard board and ANSI, forward sections.*

* cited by examiner

*Primary Examiner*—Ian N Moore

(57) ABSTRACT

A system and method to test voice quality over a call path on a packet based network. A call signaling path is established between a first voice quality tester (VQT) and a second VQT. The call signaling path includes one among multiple call signaling stacks, each operating according to a particular call signaling protocol. By using a graphical user interface (GUI), a user can select the call signaling stack to be used, and change between call signaling stacks in real time.

8 Claims, 2 Drawing Sheets

METHOD OF SWITCHING BETWEEN MULTIPLE CALL SIGNALING PROTOCOL STACKS IN A VOICE QUALITY TESTER AND APPARATUS USING SAME

BACKGROUND OF THE INVENTION

1. Field of the Invention

The present invention relates to a method of switching between multiple call signaling protocol stacks, and more particularly, to a method of real time switching in a packet-based network, and an apparatus using same.

2. Description of the Related Art

A Voice Quality Tester (VQT) is a device that measures various parameters of a phone call to quantify the impairments created by the telephone network. The measurement set is specifically designed to analyze packet based telephony networks or telephony networks that include packet based networks. These measurements include clarity, delay, echo, and signal loss.

The measurement process begins by establishing a call between two VQTs (or possibly the same VQT if multiple ports are supported on the interface in use). Different signaling methods are used to establish the call, dependent on the interface in use. Once the call is established and the media path is active, a measurement can be selected and configured to analyze the call path. For most measurements, a WAV file, or files representing speech, noise, or tone are transmitted over the network, and then received and processed by the VQT with the results subsequently displayed.

FIG. 1 is a block diagram of a conventional system 100 to test voice quality over a packet based network 160, for example, a Voice Over Internet Protocol (VOIP) network. The system 100 includes a first VQT 110 to test the packet based network 160 in connection with a second VQT 170. The system 100 further includes a call signaling protocol stack 120 (hereinafter "call signaling stack") to provide a call signaling path to establish the call, and a media processing stack 130 to provide a call path for the call itself. A TCP/IP 140 connects the call signaling data and the call with a Local Area Network (LAN) interface 150, which interfaces with the packet based network 160.

The call signaling stack 120 operates according to a protocol, such as SIP or H.323. In order to support a different protocol, the call signaling stack 120 must be reconfigured with a different software download, or a different application must be used. This is disadvantageous because a complex series of steps is required, which increases the possibility of unexpected complications. Furthermore, the reconfiguration is costly, and consumes much time. Furthermore, there is limited ability to use the system 100 to measure different networks of different clients, and thus the network 100 must be customized for each particular client.

A second known system (not shown) exists, which tests call signaling interoperability and includes multiple call signaling stacks. However, this second known system tests whether or not a call can be established, but does not test the quality of the call path, and therefore is not a VQT.

SUMMARY OF THE INVENTION

Accordingly, the present invention overcomes the above disadvantages of the known systems.

The present invention also provides a VQT testing system having multiple call signaling stacks, which can be switched between in real time.

Additional advantages of the invention will be set forth in part in the description which follows and, in part, will be obvious from the description, or may be learned by practice of the invention.

The foregoing and other advantages of the present invention are achieved by providing a system to test voice quality over a call path on a packet-based network. The system includes a first voice quality tester (VQT); a second VQT communicating with the first VQT via the call path; a first call signaling stack to establish a call signaling path between the first and second VQTs according to a first call signaling protocol; and a second call signaling stack to establish the call signaling path between the first and second VQTs according to a second call signaling protocol. Either the first or the second call signaling stack is selected by a user to establish the call signaling path.

The foregoing and other advantages of the present invention are also achieved by providing a method to test voice quality over a call path on a packet-based network. The method includes establishing a call path between a first voice quality tester (VQT) and a second VQT; and selecting between a first call signaling stack to establish a call signaling path between the first and second VQTs according to a first call signaling protocol, and a second call signaling stack to establish the call signaling path between the first and second VQTs according to a second call signaling protocol.

The foregoing and other advantages of the present invention are also achieved by providing a method to test voice quality over a call path on a packet-based network. The method includes establishing a call signaling path between a first voice quality tester (VQT) and a second VQT, the call signaling path including a first call signaling stack operating according to a first call signaling protocol; and changing, in real time, the call signaling path to include a second call signaling stack operating according to a second call signaling protocol.

BRIEF DESCRIPTION OF THE DRAWINGS

These and other advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
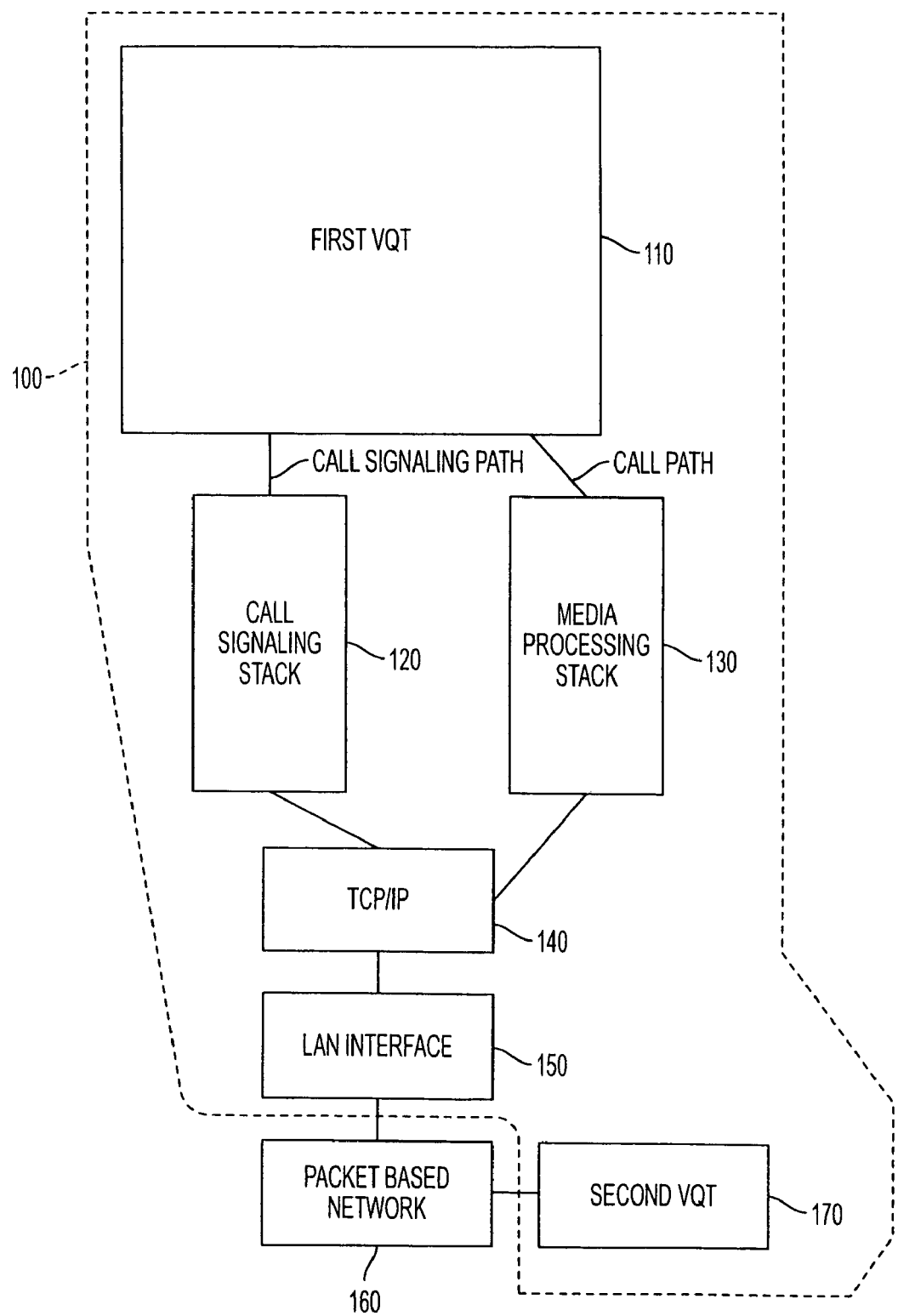
FIG. 1 is a block diagram of a conventional system to test voice quality over a packet based network.

Reference will now be made in detail to the present preferred embodiments of the present invention, examples of which are illustrated in the accompanying drawings, wherein like reference numerals refer to like elements throughout.

Figure 2:
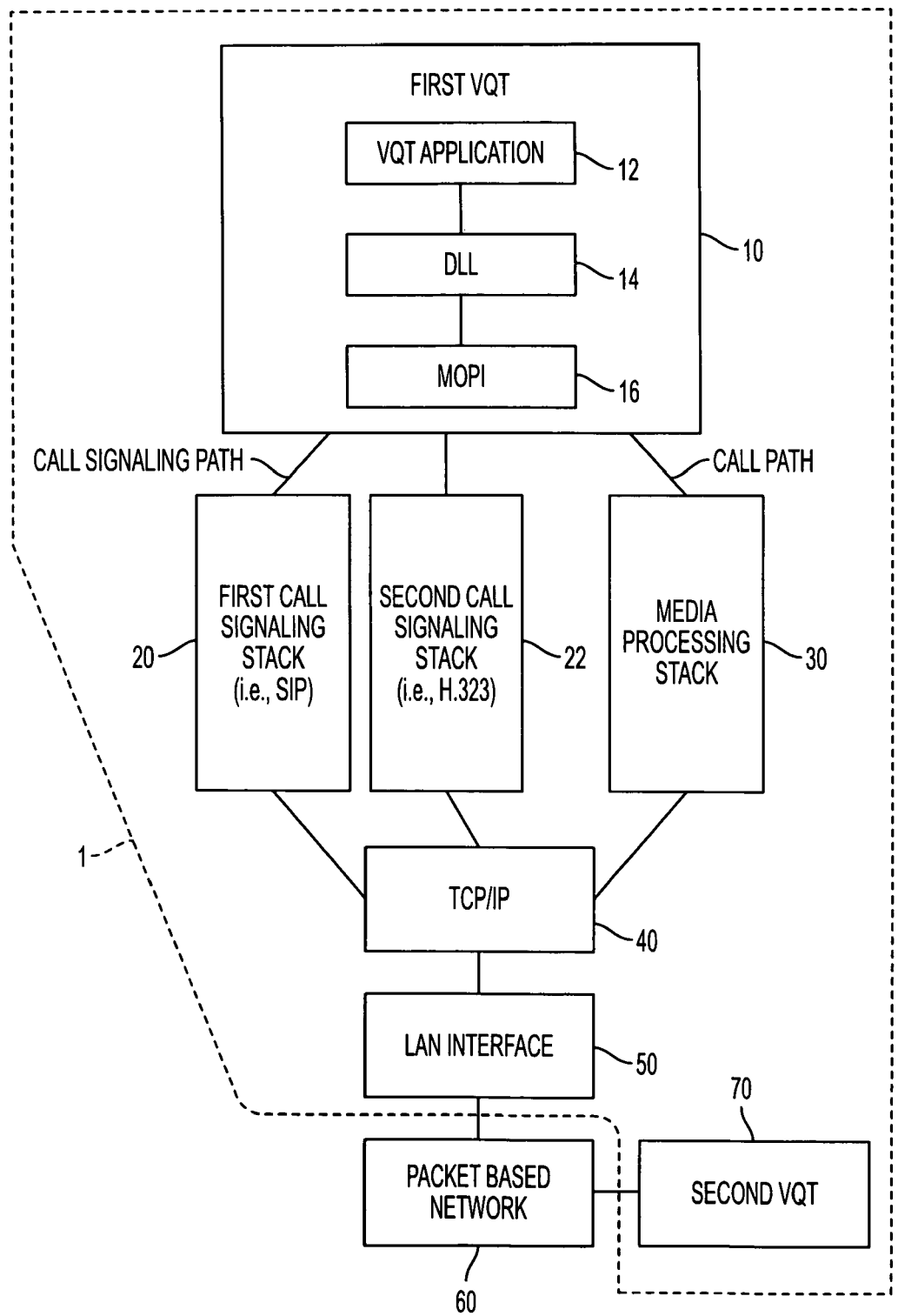
FIG. 2 is a block diagram of a system to test voice quality over a packet based network according to an embodiment of the present invention.

FIG. 2 is a block diagram of a system 1 to test voice quality over a packet based network 60 according to an embodiment of the present invention. The network 60 may be a VoIP network; however, other packet-based networks may be tested. A user interacts with a first VQT 10 through a graphical user interface (GUI) (not shown), which is encompassed within a VQT application 12 of the VQT 10. Through a port setup screen in the GUI, the user indicates which signaling protocol is used to establish the call. An advanced configuration screen of the GUI allows the user to set protocol specific configuration parameters. Another screen is provided to specify which parameters of the packet based network 60 are measured.

The first VQT 10 also includes a Dynamic Link Library (DLL) 14, which allows a consistent Application Programming Interface (API) to the VQT application code. The DLL 14 is an interface specific DLL, and in the case of a 10/100 ETHERNET interface, a VQTLanSCM DLL is used. Other interface types such as FXO, ENM, T1, and E1 may also be used to allow the first VQT 10 to access different points in the packet based network 60 to more easily isolate network problems.

The first VQT 10 also includes a Media Over Packet Interface (MOPI) 16, which interfaces with a first call signaling protocol stack 20 (hereinafter first call signaling stack), a second call signaling protocol stack 22 (hereinafter second call signaling stack), and a media processing stack 30.

The first call signaling stack 20 establishes a call signaling path according to a first call signaling protocol, and the second call signaling stack 22 establishes the call signaling path according to a second call signaling protocol. For example, FIG. 2 illustrates that the first call signaling protocol is SIP, and the second call signaling protocol is H.323. These particular protocols are used for purpose of example, only, and other protocols such as MGCP or MEGACO may be used. These protocols are "upper layer" protocols insofar as they are above a TCP/IP 40. Using the GUI, the user selects either the first call signaling stack 20 or the second call signaling stack 22 as the active stack. Therefore only one stack is active at any one time. Depending on the particular protocol being used, the TCP/IP 40 may instead be a UDP/IP.

The call signaling stacks 20, 22 establish the call signaling path, and it is the media processing stack 30 which establishes the call path. As an example, the media processing stack 30 operates according to RTP to carry a media stream such as voice data. However, other protocols may be used, and other types of data, such as video, can be handled by the media processing stack 30. A LAN interface 50 interfaces with the packet based network 60, which may be a 10/100 Mbps ETHERNET, or a gigabit ETHERNET. Other packet based networks may also be used.

The operation of the system 1 will now be described. The user views the GUI screens, either at the site of the system 1, or remotely via headless servers (not shown). The user selects the desired call signaling stack 20 or 22 through the port setup screen, and establishes the parameters of the desired protocol with the advanced configuration screen. The user may also select which parameters of the packet based network 60 are to be tested. The user may select clarity (PAMS, PSQM, or PESQ), high resolution delay, delay for packets over the network, echo PACE, or signal loss over the call path.

The DLL 14 then receives control and data information from the VQT application 12. The control and data information may include which protocol to use, configuration data particular to the protocol, a signal to place the call and the destination of the call, or other data.

The DLL 14 passes the control and data information to the MOPI 16, after some reformatting. The MOPI 16 then sends the information to either the first call signaling stack 20, the second call signaling stack 22, or the media processing stack 30, depending on the nature of the information. For example, the information may include stack specific commands, and the MOPI 16 sends these commands to the appropriate stack. These stack specific commands may include protocol configuration commands, protocol initialize and de-initialize commands, or a place or drop call command. The MOPI 16 performs any translation necessary to interface with the particular destination. Furthermore, the MOPI 16 interfaces between the call signaling stacks 20, 22 and the media processing stack 30. For example, if the active call signaling stack receives a signal that the call has failed or been completed, the MOPI 16 is notified, and then the MOPI 16 turns off the media processing stack 30.

To change from the active call signaling stack to the other call signaling stack, the user accesses the port set up screen on the GUI, and enters the change. The active call signaling stack is then de-initialized, and the newly selected call signaling stack is initialized. It is not necessary to reconfigure the entire system 1, therefore the process of changing the selected call signaling stack can be performed in real time. "Real time" means that it appears from the point of view of a user that the changing of the call signaling stack is instantaneous, even though it may take a very small but finite amount of time for the system to process the user's request to change.

As described above, the present invention can switch between call signaling stacks with a simple selection by the user. Since multiple stacks exist within the application, the transition between stacks is performed in real time. By simplifying the switching procedure, unexpected problems are minimized and it is not necessary to locate the software necessary to reconfigure the entire system. The present system is compatible with a large number of different networks, without the need to customize the testing apparatus for each particular network.

Although two call signaling stacks are shown in FIG. 2, three or more call signaling stacks, each with a different call signaling protocol, may be included in the present invention. Although FIG. 2 illustrates a testing system that includes two VQTs, it is possible to use a single VQT if multiple ports are supported on the interface in use, as is known in the art.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A system to test voice quality over call path on a packet-based network, comprising:

a first voice quality tester (VQT);

a second VQT communicating with the first VQT via the call path;

a first call signaling stack to establish a call signaling path between the first and second VQTs according to a first call signaling protocol; and a second call signaling stack to establish the call signaling path between the first and second VQTs according to a second call signaling protocol, either the first or the second call signaling stack being selected by a user to establish the call signaling path, wherein the first VQT comprises:

a VQT application to generate control and data information;

a dynamic link library (DLL) to relay the information; and a Media Over Packet Interface (MOPI) to receive the relayed information from the DLL, wherein the VQT application includes a graphical user interface (GUI), including a port setup screen, the user selecting the selected call signaling stack at the port setup screen, wherein the relayed information received by the MOPI includes a command which is specific to the selected call signaling stack, and the MOPI transfers the command to the selected call signaling stack.

2. The system of claim 1, wherein the packet-based network is an Ethernet network.

3. The system of claim 1, wherein the user changes the selected call signaling stack without reconfiguring the system.

4. The system of claim 1, wherein the selected call signaling stack is changed in real time.

5. The system of claim 1, wherein the command is a configuration command, an interface command, a de-initialize command, a place call command, or a drop call command.

6. The system of claim 1, wherein the DLL is an interface specific DLL.

7. A system to test voice quality over call path on a packet-based network, comprising;
 a first voice quality tester (VQT), having,
  a VQT application to generate control and data information;
  a dynamic link library (DLL) to relay the information, wherein the DLL is an interface specific DLL, and wherein the DLL is a voice quality tester local area network single call model dynamic link library (VQT-LanSCM DLL); and
  a Media Over Packet Interface (MOPI) to receive the relayed information from the DLL;
 a second VQT communicating with the first VQT via the call path;
 a first call signaling stack to establish a call signaling path between the first and second VQTs according to a first call signaling protocol; and
 a second call signaling stack to establish the call signaling path between the first and second VQTs according to a second call signaling protocol, either the first or second call signaling stack being selected by a user to establish the call signaling path, wherein the relayed information received by the MOPI includes a command which is specific to the selected call signaling stack, and the MOPI transfers the command to the selected call signaling stack.

8. The system of claim 7, further comprising:
 a Local Area Network (LAN) interface to interface with the network; and
 a TCP/IP between the LAN interface and the first and second call signaling stacks.

\* \* \* \* \*

UNITED STATES PATENT AND TRADEMARK OFFICE
CERTIFICATE OF CORRECTION

PATENT NO.         : 7,519,002 B2
APPLICATION NO. : 10/225145
DATED              : April 14, 2009
INVENTOR(S)        : James P. Quan et al.

Page 1 of 1

It is certified that error appears in the above-identified patent and that said Letters Patent is hereby corrected as shown below:

On the title page, item (56), under "Other Publications", in column 2, line 2, delete "neworks," and insert -- networks, --, therefor.

On the title page, item (56), under "Other Publications", in column 2, line 3, delete "dectection" and insert -- detection --, therefor.

On the title page, item (56), under "Other Publications", in column 2, line 4, delete "methold" and insert -- method --, therefor.

On the title page, item (56), under "Other Publications", in column 2, line 5, delete "IEE" and insert -- IEEE --, therefor.

Signed and Sealed this

Fourteenth Day of July, 2009

JOHN DOLL
*Acting Director of the United States Patent and Trademark Office*